United States Patent [19]
Chilton

[11] 3,818,071
[45] June 18, 1974

[54] REDUCTION OF ACIDITY IN THE PRODUCTION OF ESTERS

[75] Inventor: John Reginald Chilton, Stockton-on-Tees, England

[73] Assignee: Imperial Chemical Industries Limited, London, England

[22] Filed: Feb. 18, 1971

[21] Appl. No.: 116,345

[30] Foreign Application Priority Data
Mar. 18, 1970  Great Britain.................... 13036/70

[52] U.S. Cl......... 260/475 A, 260/410.5, 260/410.6, 260/410.9 R, 260/468 K, 260/475 PR, 260/475 B, 260/475 PN, 260/476 R, 260/479 R, 260/479 S, 260/484 B, 260/484 P, 260/485 G, 260/485 L, 260/485 P, 260/485 S, 260/486 R, 260/499

[51] Int. Cl............................................ C07c 69/80

[58] Field of Search ........ 260/485 R, 475 R, 475 B, 260/475 PR, 476, 485 S, 499, 410.9 R, 410.6, 410.5, 479.5 R, 486 R, 484 B, 484 P, 468 K, 475 A

[56] References Cited
UNITED STATES PATENTS

| | | | |
|---|---|---|---|
| 2,508,911 | 5/1950 | Garner et al.................... | 260/475 B |
| 2,537,890 | 1/1951 | Gearhart et al..................... | 260/499 |
| 2,753,369 | 7/1956 | Sullivan........................... | 260/475 B |
| 2,778,849 | 1/1957 | Ackelsberg..................... | 260/475 B |

*Primary Examiner*—Lorraine A. Weinberger
*Assistant Examiner*—E. Jane Skelly
*Attorney, Agent, or Firm*—Cushman, Darby & Cushman

[57] ABSTRACT

The residual acidity of the product of an esterification process is reduced by contacting it with steam and a finely divided solid alkali such as sodium carbonate at a temperature in excess of 100°C. The process is particularly applicable to plasticiser esters such as dialkyl phthalates and possesses the added advantage of cleanly removing a titanium catalyst if the latter has been used in the esterification process.

8 Claims, No Drawings

REDUCTION OF ACIDITY IN THE PRODUCTION OF ESTERS

The present invention relates to the production of esters, in particular to the production of esters with a low residual acidity.

The production of esters by the direct esterification of an alcohol with an acid or an acid anhydride frequently yields an ester possessing a residual acidity even when excess of the alcohol is present and the reaction is carried out in the presence of a non-acidic esterification catalyst. If an acid esterification catalyst is used such as sulphuric acid or p-toluene sulphonic acid, then the residual acidity is likely to be even higher. Conventionally, the ester product is cooled and washed with an aqueous alkali solution to remove the esterification catalyst and to reduce the residual acidity but this treatment requires the ester to be cooled below 100°C and often gives rise to phase separation difficulties between the ester phase and the aqueous phase with consequent loss of product on phase separation. In particular, when certain metal containing esterification catalysts are present, e.g., titanium compounds, the use of aqueous alkali hydrolyses the metal compound to produce a gelatinous precipitate which tends to aggravate the loss of product when the organic and aqueous phases are separated. Furthermore in esterification processes in which a relatively high boiling alcohol is used, e.g., a $C_6$ to $C_{14}$ alkanol it is customary to remove the excess alcohol at the end of the reaction by blowing steam through the reaction product at a temperature in excess of 100°C. If this method of alcohol removal is attempted without first removing the esterification catalyst the latter, if an acid catalyst, catalyses the hydrolysis of the ester resulting in an increase in acidity, while a titanium catalyst is hydrolysed to a difficulty separable gel. Esterification reactions are often carried out at temperatures up to 250°C, so if the catalyst has to be separated by conventional means before removal of the excess alcohol, the reaction product must be cooled from 250°C to about 100°C for treatment with aqueous alkali and must then be reheated to above 140°C for treatment with steam. Such heating, cooling and reheating is costly both in terms of time and money.

We have now found a method of reducing the residual acidity in the ester product without cooling the latter and which at the same time is effective in removing many of the catalysts which are popularly used in esterification processes.

According to the invention a process for the reduction of the acidity of the ester product of an esterification process comprises contacting the product with steam and a finely divided solid alkali at a temperature in excess of 100°C.

The process of the invention is generally applicable to esters which boil above 100°C at atmospheric pressure. It is, however, particularly applicable to esters derived from the following acids:

monobasic acids: containing up to 20 carbon atoms, e.g., alkanoic acids such as myristic, palmitic and stearic acid, alkenoic acids such as oleic acid, or derivatives of such alkanoic and alkenoic acids, e.g. ricinoleic acid;

aliphatic dibasic acids: especially those containing up to 20 carbon atoms, preferably up to 10 carbon atoms such as adipic, azelaic and sebacic acids;

tribasic aliphatic acids: such as citric acid;

monobasic aromatic acids: e.g. those containing up to 10 carbon atoms, such as benzoic acid;

dibasic aromatic acids and their anhydrides: such as the three phthalic acids or phthalic anhydride, and their hydrogenation products, e.g. hexahydrophthalic anhydride, and tribasic aromatic acids and their anhydrides: such as hemimellitic, trimellitic and trimesic acids or their anhydrides.

The preferred acids are o-phthalic acid or its anhydride, adipic acid, azelaic acid and sebacic acid.

The alcohol or phenol part of esters to which the present process is particularly applicable include the following:

monohydric alcohols: containing up to 20 carbon atoms, particularly alkanols containing 4 to 14 carbon atoms, e.g., butanol, isoheptanol, iso-octanol, 2-ethylhexanol, nonanol, decanol, tridecanol and mixtures of alcohols containing, for example, 7 to 9 carbon atoms such as are obtained from olefine mixtures by the OXO process;

dihydric alcohols: containing up to 20 carbon atoms, e.g., monoethylene glycol, diethylene glycol, triethylene glycol, nono-, di-, and tripropylene glycol, the butylene glycols and 2,2,4-trimethylpentane diol;

trihydric alcohols: such as glycerol;

aliphatic cyclic alcohols: containing up to 10 carbon atoms such as cyclohexanol;

derivatives: particularly ether derivatives of the dihydric and trihydric alcohols, e.g. lower alkyl ether derivatives such as 2-butoxy-ethanol;

monohydric phenols; containing up to 10 carbon atoms, such as phenol itself and;

dihydric and trihydric phenols: such as catechol, resorcinol, hydroquinone and pyrogallol.

The preferred alcohols are the monohydric alkanols containing 4 to 14 carbon atoms.

Alkalis which may be used in the process of the present invention include the alkali metal or alkaline earth metal hydroxides, carbonates and bicarbonates, and ammonium carbonate and bicarbonate, sodium carbonate being preferred. The solid alkali is added in finely divided form, e.g., as pellets (sodium hydroxide) or as a powder (sodium carbonate) and may be added as the hydrate, e.g. sodium carbonate decahydrate.

The ester product which is treated by the present process may contain the catalyst which has been used in the esterification. Thus the catalyst may be an acid catalyst such as sulphuric, phosphoric or p-toluene sulphonic acid or a metal or metal compound catalyst such as a titanium, zirconium, tin, aluminium, or zinc compound. If an acid catalyst has been used the residual acidity in the ester product is usually about 1.0 to 3.0 mgms. KOH/gram whereas when a metal catalyst has been used the residual acidity is about 0.1 to 0.2 mgm. KOH/gram. After treatment by the process of the present invention the acid value is preferably reduced to below 0.05 mgm. KOH/gram. The process is particularly suitable for use with ester products derived from a titanium catalysed esterification, i.e., an esterification reaction catalysed by a titanium compound, e.g., a titanium ester such as tetraisopropyl titanate because as well as the reduction in acidity, removal of the titanium is also achieved by precipitation of the latter in easily filterable form.

The process is conducted at a temperature in excess of 100°C and preferably between 100° and 270°C, more preferably between 100° and 250°C. If the process is carried out under a partial vacuum, e.g. 0.5 to 0.3 bar pressure or less to assist in the removal of the excess alcohol, the temperature is suitably 140° to 210°C. If the process is conducted at atmospheric pressure or under a slight positive pressure, e.g., 2 or 3 bar then the temperature of operation may be higher, e.g. 200° – 250°C. It is frequently advantageous to add the solid alkali at 240° to 250°C under reduced pressure and then when the temperature falls to about 200°C introduce the steam to complete the reduction of the acidity.

The alkali may be added to the ester product as a suspension in the liquid ester or alcohol. It may, however, be added directly in the solid form. The amount of solid alkali added is preferably 0.1 to 10.0 Kgm/ton of ester product, more preferably 1.0 to 5.0 Kgm/ton of ester product.

The process is generally carried out using steam at a temperature of about 120°C. The steam used need not be dry; in fact it is frequently advantageous to use wet steam such as is generally obtained if a steam trap is not employed to remove the condensate water which is present.

The excess alcohol which is generally present in the esterification product may, in the case of a titanium or other metal esterification catalyst be removed before the addition of the solid alkali, e.g. by applying vacuum at a temperature of 150° to 250°C, preferably 200° to 210°C. Alternatively the excess alcohol may be distilled or steam distilled out of the ester product after addition of the alkali either before or after the latter is separated from the ester. This latter technique may be used with acid as well as metal esterification catalysts.

The process may be used with batch, continuous or semi-continuous esterification processes. In the latter case the esterification reaction may be carried out in a batch reactor and the ester product submitted to the process of the present invention also in a batchwise manner. When the solid alkali has been added the ester product is filtered and may then be introduced continuously to a steam stripper in which the remainder of the alcohol is removed by contact with steam at about 150° to 210°C.

The process of the present invention is particularly applicable to the preparation of plasticiser esters for polyvinylchloride from phthalic anhydride and a $C_4$ to $C_{14}$ alkanol or mixture of such alkanols. For example, a mixture of phthalic anhydride and one or more of these alkanols may be heated gradually up to 220° to 270°C, preferably to about 240°C, in the presence of a titanium catalyst such as titanium isopropoxide, the alkanol being in 10 to 30, e.g. 25 mole per cent excess of the stoichiometric. When the temperature reaches 240° to 250°C the esterification is substantially complete although the residual acidity is about 0.3 to 0.05, typically 0.1 mgm. KOH/gram. Solid sodium carbonate is then added and the pressure reduced. When the temperature has fallen to 200° to 210°C steam is admitted and the temperature may be held at 200° to 210°C or allowed to fall to about 140°C when the excess alkanol is finally removed. By this treatment the titanium catalyst is precipitated and may be filtered off with the sodium carbonate and the residual acidity is reduced to less than 0.05 mgm. KOH/gram, typically to 0.02 mgm. KOH/gram.

The invention will now be further described with reference to the following Examples.

EXAMPLE 1

2.25 moles iso-octanol, 1 mole phthalic anhydride and 0.001 mole of titanium isopropoxide were heated at atmospheric pressure in a flask fitted with a condenser and a Dean and Stark head. The flask was fitted with a thermometer to measure the temperature of the liquid.

The flask and contents were heated up to 240°C, the water of reaction being removed as an azeotrope with the alcohol, the latter being returned to the reaction flask. When the temperature reached 240°C the residual acidity was 0.14 mgm. KOH/gram.

The flask and contents were allowed to cool under a reduced pressure of 0.3 bar until the temperature reached 150°C. During this time the alcohol was continuously removed. On reaching 150°C 0.5 gram of anhydrous sodium carbonate was added and wet steam blown into the reaction solution through an open ended pipe dipping below the surface. At the end of the steam stripping the acid value had fallen to 0.035 mgm. KOH/gram.

EXAMPLE 2

Example 1 was repeated except that the sodium carbonate was added at 240°C and steam passed into the solution immediately at a pressure of one atmosphere. The temperature was then allowed to fall to 150°C while the pressure was reduced to 0.3 bar. The acid value fell from 0.13 mgm. KOH/gram at the end of the esterification to 0.03 mgm. KOH/gram at the end of the alkali treatment. The same figures were obtained from a repeat of the experiment.

In this form of the process a violent reaction was produced on introducing the steam at 240°C.

EXAMPLE 3

Example 1 was repeated but at 240°C the sodium carbonate was added and the pressure reduced to 0.3 bar, when the temperature fell to 200°C. The steam was introduced and the temperature allowed to fall further to 150°C where it was held for 10 minutes.

The residual acidity after the esterification was 0.12 mgm. KOH/gram while after the treatment it fell to 0.03 mgm. KOH/gram. In a repeat experiment the acid value was reduced from 0.10 to 0.03 mgm. KOH/gram.

In all the above Examples the 0.25 mole excess of iso-octanol was reduced to 0.05 mole by the time the temperature had reached 150°C. The sodium carbonate was filtered off and the titanium catalyst removed at the same time. The remaining 0.05 mole alcohol could then be removed by distillation or by further steam stripping.

EXAMPLES 4 TO 51

A series of experiments were carried out using different acids, alcohols, esterification catalysts and alkalis. The esterification catalysts used were sulphuric acid, p-toluene sulphonic acid and titanium isopropoxide. The sulphuric acid and sulphonic acid catalysed esterifications were conducted as follows:

33 Moles alcohol (10 percent excess over stoichiometric), 15 moles acid and 0.15 mole sulphuric or p-toluene sulphonic acid were placed in a 20 litre glass reaction vessel fitted with a Dean and Stark head, a thermometer dipping into the liquid, a sampling device and an electric heating mantle. The reaction was conducted at 150°C for 5 hours at a pressure less than 130 milli bar. The water of reaction was removed as an azeotrope with the alcohol, the latter being returned to the reaction.

The titanium isopropoxide catalysed reaction was conducted in the same apparatus as the sulphuric and sulphonic acid catalysed reactions. In this instance, however, 37.5 moles alcohol, a 25 percent excess over stoichiometric, were reacted with 15 moles of acid using 0.015 mole of titanium isopropoxide as catalyst. The temperature and time of the reaction were 240°C and 2 hours respectively, the pressure being atmospheric.

At the end of the reaction in all experments samples of the product were removed and the residual acidity determined. 500 Grams of each product were then placed in a litre flask at 150°C together with 4 to 10 times the stoichiometric amount of solid alkali required to neutralise the residual acidity. Steam was then blown through the liquid at 150°C and 130 milli bar pressure. On completion of the neutralisation the product was filtered hot through kieselguhr. Results of the experiments were as follows:

| Example | Acid | Alcohol | Catalyst | Final Acid Value of Esterification Product (mgs. KOH/g) | Alkali | Neutralisation Excess over Stoichiometric | Final Acidity (mgs. KOH/g) |
|---|---|---|---|---|---|---|---|
| 4 | Phthalic anhydride | Iso-octanol | Sulphuric Acid | 1.2 | KOH | 4 times | 0.04 |
| 5 | do. | do. | do. | 1.2 | NaOH | 4 times | 0.2 |
| 6 | do. | do. | do. | 1.2 | Ca(OH)₂ | 10 times | 0.04 |
| 7 | do. | do. | do. | 1.83 | Na₂CO₃ | 4 times | 0.04 |
| 8 | do. | do. | p-Toluene Sulphonic Acid | 1.3 | KOH | 10 times | 0.02 |
| 9 | do. | do. | do. | 1.3 | NaOH | 10 times | — |
| 10 | do. | do. | do. | 1.3 | Ca(OH)₂ | 10 times | 0.04 |
| 11 | do. | do. | do. | 1.3 | Na₂CO₃ | 4 times | 0.2 |
| 12 | do. | do. | Titanium isopropoxide | 0.08 | KOH | 4 times | 0.04 |
| 13 | do. | do. | do. | 0.08 | NaOH | 4 times | 0.04 |
| 14 | Phthalic anhydride | Iso-octanol | Titanium isopropoxide | 0.08 | Ca(OH)₂ | 4 times | 0.04 |
| 15 | do. | do. | do. | 0.08 | Na₂CO₃ | 4 times | 0.03 |
| 16 | do. | Isodecanol | Sulphuric Acid | 0.9 | KOH | 4 times | 0.06 |
| 17 | do. | do. | do. | 0.9 | NaOH | 10 times | 0.8 |
| 18 | do. | do. | do. | 0.9 | Ca(OH)₂ | 10 times | 0.04 |
| 19 | do. | do. | do. | 0.9 | Na₂CO₃ | 4 times | 0.02 |
| 20 | do. | do. | p-Toluene Sulphonic Acid | 1.1 | KOH | 4 times | 0.02 |
| 21 | do. | do. | do. | 1.1 | NaOH | 4 times | — |
| 22 | do. | do. | do. | 1.1 | Ca(OH)₂ | 10 times | 0.03 |
| 23 | do. | do. | do. | 1.1 | Na₂CO₃ | 4 times | 0.02 |
| 24 | Phthalic Anhydride | Isodecanol | Titanium Isopropoxide | 0.12 | KOH | 4 times | 0.03 |
| 25 | do. | do. | do. | 0.12 | NaOH | 4 times | 0.03 |
| 26 | do. | do. | do. | 0.12 | Ca(OH)₂ | 4 times | 0.05 |
| 27 | do. | do. | do. | 0.12 | Na₂CO₃ | 4 times | 0.03 |
| 28 | Adipic Acid | Iso-octanol | Sulphuric Acid | 0.6 | KOH | 4 times | 0.02 |
| 29 | do. | do. | do. | 0.6 | NaOH | 4 times | 0.04 |
| 30 | do. | do. | do. | 0.6 | Ca(OH)₂ | 4 times | 0.15 |
| 31 | do. | do. | do. | 0.6 | Na₂CO₃ | 4 times | 0.01 |
| 32 | do. | do. | p-Toluene Sulphonic Acid | 0.8 | KOH | 4 times | 0.02 |
| 33 | do. | do. | do. | 0.8 | NaOH | 4 times | 0.03 |
| 34 | Adipic Acid | Iso-octanol | p-Toluene Sulphonic Acid | 0.8 | Ca(OH)₂ | 4 times | 0.04 |
| 35 | do. | do. | do. | 0.8 | Na₂CO₃ | 4 times | 0.02 |
| 36 | do. | do. | Titanium Isopropoxide | 0.1 | KOH | 4 times | 0.01 |
| 37 | do. | do. | do. | 0.1 | NaOH | 4 times | 0.02 |
| 38 | do. | do. | do. | 0.1 | Ca(OH)₂ | 4 times | 0.07 |
| 39 | do. | do. | do. | 0.1 | Na₂CO₃ | 4 times | 0.05 |
| 40 | do. | Isodecanol | Sulphuric Acid | 1.3 | KOH | 4 times | 0.05 |
| 41 | do. | do. | do. | 1.3 | NaOH | 4 times | 0.04 |
| 42 | do. | do. | do. | 1.3 | Ca(OH)₂ | 4 times | 0.9 |
| 43 | do. | do. | do. | 1.3 | Na₂CO₃ | 4 times | 0.03 |
| 44 | Adipic Acid | Isodecanol | p-Toluene Sulphonic Acid | 0.9 | KOH | 4 times | 0.04 |
| 45 | do. | do. | do. | 0.9 | NaOH | 4 times | 0.02 |
| 46 | do. | do. | do. | 0.9 | Ca(OH)₂ | 4 times | — |
| 47 | do. | do. | do. | 0.9 | Na₂CO₃ | 4 times | 0.25 |
| 48 | do. | do. | Titanium Isopropoxide | 0.16 | KOH | 4 times | 0.02 |
| 49 | do. | do. | do. | 0.16 | NaOH | 4 times | 0.08 |
| 50 | do. | do. | do. | 0.16 | Ca(OH)₂ | 4 times | 0.07 |
| 51 | do. | do. | do. | 0.16 | Na₂CO₃ | 4 times | 0.02 |

The potassium hydroxide and sodium hydroxide were added as pellets, the sodium carbonate and calcium hydroxide as a powder. The filterability of the final neutralised product was generally satisfactory particularly when the neutralisation was carried out using solid sodium carbonate. Comparison of the particle size of the precipitate in an un-neutralised sample of di-isooctylphthalate with a sample neutralised by solid sodium carbonate in accordance with the present invention shows an increased particle size and consequent ease of filtration for the neutralised product.

The products of the process exemplified in Examples 3 to 51 above were still clear and mobile after three weeks storage in glass at ambient temperature.

I claim:

1. In an esterification process in which the ester product is derived from a carboxylic acid selected from the group consisting of monobasic alkanoic acids containing up to 20 carbon atoms, monobasic alkenoic acids containing up to 20 carbon atoms, aliphatic dibasic acids containing up to 20 carbon atoms, monobasic aromatic acids containing up to 10 carbon atoms, dibasic aromatic acids and tribasic aromatic acids; and an organic hydroxy compound selected from the group consisting of monohydric alcohols containing up to 20 carbon atoms, dihydric alcohols containing up to 20 carbon atoms, trihydric alcohols, ether derivatives of dihydric alcohols, ether derivatives of trihydric alcohols, monohydric phenols containing up to 10 carbon atoms, dihydric phenols and trihydric phenols, the improvement by which the acidity of the ester product is reduced by contacting said product with steam and a finely divided solid alkali at a temperature in excess of 100°C, the ester product containing a titanium esterification catalyst and said solid alkali being selected from the group consisting of alkali metal hydroxides, alkali metal carbonates, alkali metal bicarbonates, ammonium carbonate, ammonium bicarbonate, alkaline earth metal hydroxides, alkaline earth metal carbonates and alkaline earth metal bicarbonates.

2. The process of claim 1 in which the carboxylic acid is adipic acid, azelaic acid, sebacic acid, a phthalic acid, a hydrogenated phthalic acid, phthalic anhydride, hemimellitic acid, trimellitic acid, trimesic acid or an anhydride of hemimellitic, trimellitic or trimesic acid.

3. The process of claim 1 in which wet steam at a temperature of 120°C is used.

4. The process of claim 1 in which the ester product is derived by:
   a. heating phthalic anhydric or orthophthalic acid with a titanium catalyst and an alkanol selected from the group consisting of butanol, isoheptanol, iso-octanol, 2-ethylhexanol, nonanol, decanol, tridecanol and a mixture of alkanols containing 7 to 9 carbon atoms derived from olefine mixtures by the OXO process until a temperature of 220° to 270°C is attained, the alkanol being in 10 to 30 mole percent excess of the stoichiometric and thereafter,
   b. solid sodium carbonate is added,
   c. the pressure is reduced,
   d. steam is admitted when the temperature has fallen to 200° to 210° and,
   e. excess alcohol is finally removed at 140° to 210°C.

5. The process of claim 2 in which the ester product is derived from an alkanol containing 4 to 14 carbon atoms.

6. The process of claim 1 in which the temperature is in the range 100° to 270°C.

7. The process of claim 1 in which the solid alkali is added at a temperature of 240° to 250°C under reduced pressure and the steam is subsequently introduced when the temperature falls to 200°C.

8. The process of claim 1 in which 0.1 to 10.0 kilograms of solid alkali are added per ton of ester product.

* * * * *